United States Patent [19]
Edwards et al.

[11] 4,175,059
[45] Nov. 20, 1979

[54] METHOD OF PREPARING A NOVEL PLATELET-TYPE CRYSTALLINE FORM OF SYNTHETIC FAUJASITE

[75] Inventors: Grant C. Edwards, Silver Spring; David E. W. Vaughan, Ellicott City; Edwin W. Albers, Annapolis, all of Md.

[73] Assignee: W. R. Grace & Co., New York, N.Y.

[21] Appl. No.: 931,512

[22] Filed: Aug. 7, 1978

Related U.S. Application Data

[63] Continuation-in-part of Ser. No. 764,246, Jan. 31, 1977, abandoned, which is a continuation-in-part of Ser. No. 592,439, Jul. 2, 1975, abandoned.

[51] Int. Cl.$^2$ .................. B01J 29/08; C01B 33/28
[52] U.S. Cl. ...................... 252/455 Z; 423/328; 423/329
[58] Field of Search ............... 423/328–330, 423/118; 252/455 Z

[56] References Cited

U.S. PATENT DOCUMENTS

| 3,140,251 | 7/1964 | Plank et al. | 252/455 Z |
| 3,374,058 | 3/1968 | McDaniel et al. | 423/329 |
| 3,574,538 | 4/1971 | McDaniel et al. | 423/329 |
| 3,767,771 | 10/1973 | Guth et al. | 423/329 |
| 3,808,326 | 4/1974 | McDaniel et al. | 423/329 |

FOREIGN PATENT DOCUMENTS

| 1051621 | 12/1966 | United Kingdom | 423/329 |
| 1111849 | 5/1968 | United Kingdom | 423/329 |

Primary Examiner—Edward J. Meros
Attorney, Agent, or Firm—Arthur P. Savage

[57] ABSTRACT

A process for preparing a synthetic faujasite having a novel platelet-type crystalline shape and a silica to alumina ratio above 2.2 by adding potassium ions to a seeded faujasite synthesis slurry and heating to convert to the synthetic faujasite. The use of the novel zeolite form as a catalyst promoter and an adjuvant for strengthening formed zeolite such as beads, balls, pills and extrudates is also disclosed.

15 Claims, 4 Drawing Figures

METHOD OF PREPARING A NOVEL PLATELET-TYPE CRYSTALLINE FORM OF SYNTHETIC FAUJASITE

This application is a continuation-in-part of U.S. Ser. No. 764,246 filed Jan. 31, 1977 which is a continuation-in-part of U.S. Ser. No. 592,439 filed July 2, 1975, both now abandoned.

BACKGROUND OF THE INVENTION

1. Field of the Invention

The present invention relates to the production of crystalline alumino-silicates commonly referred to as zeolites or molecular sieves. More specifically, this invention relates to the preparation of faujasite materials having a novel particle size and shape, and to adsorbent and catalyst compositions prepared therefrom.

2. Description of the Prior Art

Crystalline aluminosilicate zeolites, commonly referred to as "molecular sieves," are well known in the art. These materials are characterized by a very highly ordered crystalline structure arranged such that uniformly dimensioned pores result. The crystal structure of these zeolites involves a three-dimensional framework of $AlO_4$ and $SiO_4$ tetrahedra which are cross-linked by the sharing of oxygen atoms, so that the ratio of oxygen atoms to the total of aluminum and silicon atoms is equal to two. The electronegativity of these tetrahedra is balanced by the presence within the crystal of cations, usually alkali metal cations, such as sodium and potassium ions.

Faujasite is a naturally occurring alumino-silicate. It has a characteristic X-ray structure. The synthetic materials designated zeolite "X" and zeolite "Y" by the Linde Division of Union Carbide Corporation are commonly referred to as synthetic faujasites. Zeolite Y is described in U.S. Pat. No. 3,130,007 and is generally similar to zeolite X described in U.S. Pat. No. 2,882,244. The chemical formula for zeolite Y given in U.S. Pat. No. 3,130,007 is as follows:

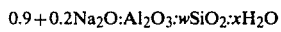

$$0.9 \pm 0.2 Na_2O : Al_2O_3 : wSiO_2 : xH_2O$$

wherein W has a value of greater than 2.5 and up to about 6 and x may have a value as high as 9.

U.S. Pat. No. 3,374,058 to McDaniel et al, U.S. Pat. No. 3,767,771 to Guth, British Pat. No. 1,051,621 to Furtig, and British Pat. No. 1,111,849 to Wolf disclose methods for preparing crystalline aluminosilicate zeolites of the faujasite type wherein various quantities of potassium ions are added to a reaction mixture containing silicate, aluminate, water and sodium hydroxide.

U.S. Pat. No. 3,808,326 to McDaniel discloses a method for preparing zeolites wherein zeolite seeds are added to reaction mixtures which comprise silica, alumina, water and alkali metal hydroxide, such as sodium, potassium, and lithium hydroxides.

The product recovered from the usual methods of preparing synthetic faujasite described in the patent and technical literature is a fine sized, uniformly shaped crystalline zeolite having the well-known equart octahedreal shape disclosed by V. Goldschmidt, *Atlas der Krystalloformen*, Vol. 8, plate 47, figure 17. Several of the uses for molecular sieves require a product in a size range substantially larger than the size of the product recovered from the preparation processes of the prior art. To meet this demand processes have been developed which add various binders and use forming steps to prepare microspheres, beads, nodules and extrusions containing molecular sieves as the principal ingredient. These products lose some of their effectiveness since the binder is generally inert and acts as a diluent of the molecular sieve activity. Even in the case of the so called "binderless" molecular sieve bodies the transformation of the binder is generally not 100% complete.

The activity of a zeolite composite has to do with the weight of zeolite per unit of volume. Hence a composite with a higher density of zeolite will be more active as well as being stronger. Prior art synthetic faujasite crystallites had certain fixed packing characteristics because of the shape and size of the crystallites produced by prior art processes.

It would be highly desirable to produce synthetic faujasite in a platelet crystallite form which would pack more densely and could be used either alone to form highly active, strong composites or in combination with normally shaped zeolite crystallites as a strong active binder, or lubricant component.

SUMMARY

Figure 1:
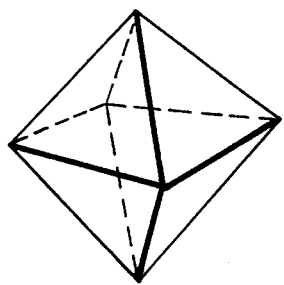
FIG. 1 is a drawing of a typical prior art faujasite crystal which indicates the crystal shape of conventional faujasite is an equant octahedron.

Our present invention contemplates a novel form of faujasite in which a substantial portion of the crystals possess a novel flattened or platelet form.

More specifically, we have found that a novel and useful platelet form of faujasite may be obtained by the addition of potassium ions to a faujasite reaction mixture of silica, alumina, sodium hydroxide and water which is combined with finely amorphous silica-alumina nucleation centers (seeds), and reacted at elevated temperatures.

The presently contemplated faujasite type zeolite is prepared by combining silica, alumina, sodium hydroxide (expressed as $Na_2O$), potassium ions (expressed as $K_2O$), water, and seeds in the following ratios:

$Na_2O/SiO_2$—0.3 to 9
$SiO_2/Al_2O_3$—3 to 25
$H_2O/Na_2O$—12 to 90
$K_2O/Al_2O_3$—0.05 to 1.2

The above noted ratios include the $SiO_2$, $Al_2O_3$, $Na_2O$, and $H_2O$ contributed by the seeds. The $K_2O$ component is added to the reaction mixture directly, that is the $K_2O$ is not included in the seeding component.

In a preferred practice of our invention, reaction mixture ratios may be selected which will yield the novel faujasite type zeolites having silica to alumina ratios which fall within the ranges generally specified for Type X or Type Y zeolites. Accordingly, to obtain our novel faujasite product having either a low or high silica to alumina ratio a reaction mixture ratio is selected from the following:

(a) For a faujasite type product having a silica to alumina ratio of 2.2 to 3.0 (Type X zeolite):
$Na_2O/SiO_2$—0.3 to 1.5
$SiO_2/Al_2O_3$—3 to 5
$H_2O/Na_2O$—30 to 50
$K_2O/Al_2O_3$—0.05 to 1.2

(b) For faujasite type products having a silica to alumina ratio of above 3.0 (Type Y zeolite):
$Na_2O/SiO_2$—0.3 to 9
$SiO_2/Al_2O_3$—5 to 25
$H_2O/Na_2O$—12 to 90
$K_2O/Al_2O_3$—0.05 to 1.2

The above reaction mixtures include from about 0.1 to 40 mol percent, alumina basis, of finely divided amorphous silica-alumina nucleation centers which have the following mol composition ranges;
$Na_2O$—13 to 20
$SiO_2$—14 to 19
$Al_2O_3$—0.75 to 5
$H_2O$—100 to 600

The preparation and use of nucleation centers in zeolite synthesis is well known and disclosed in U.S. Pat. Nos. 3,808,326 and 3,574,538 to McDaniel et al.

In general the amount of potassium was present in the zeolite reaction mixture will determine the proportion of platelet crystals which are present in the final faujasite product. Thus for example, where it is desired to obtain a faujasite which comprises essentially all platelets of the type shown in FIGS. 2 and 3 the larger quantities of potassium indicated in the above reaction ratios will be utilized. It should be noted however, if the quantities of potassium above indicated are exceeded, it is found that the faujasite reaction is adversely affected. Furthermore, it is noted that the potassium ingredient must be added to the reaction mixture directly, not by way of the nucleation centers (seed) component. To obtain our faujasite type product which comprises only a part of the crystals in platelet form such as shown in FIG. 4, lesser quantities of potassium ion are added to the reaction mixture. By varying the potassium ion content through the ranges indicated, novel products can be readily obtained which contain from about 5 to 100% of the crystals in platelet form.

"Y" type zeolite precursor mixtures can be formed by the proper quantities of metakaolin and sodium silicate, or by dissolving aluminum trihydrate in sodium hydroxide and adding sufficient sodium silicate. The faujasite-type zeolites are normally prepared in the sodium form. Since this is the case, the silicate usually employed is a commercially available sodium silicate having a $SiO_2$ to $Na_2O$ mole ratio of 3.3:1 to 3.4:1. This silicate is diluted with water when necessary to provide a silicate solution having the desired concentration. Additional $Na_2O$ may be added as NaOH.

The clay used can be a kaolin clay that has been calcined to convert it to metakaolin. This conversion is effected by calcination of raw kaolin clay to a temperature of 1200° to 1500° F.

The sources of the reactants, silica, alumina, sodium are rather immaterial. It is the ratios of these reactants in the precursor mixture which is crucial to the type of faujasite zeolite produced.

The next step in the process of the present invention is the addition of potassium ions to the zeolite precursor mixture. It has been found that this addition of potassium ions brings about an alteration in the shape and size of the end product zeolite crystallites. Whereas, normal sodium X and Y-type crystals made by the seeding process of (U.S. Pat. No. 3,574,538) have the form of an equant octahedron as shown in FIG. 1 on the order of 0.4–0.8 microns in size, the crystals produced by the process of this invention are flattened and platelet shaped.

Any water soluble compound of potassium is suitable for this addition step. However, it is generally desirable to keep the amounts of contaminating ions to a minimum as these must be subsequently washed or exchanged from the product zeolite in order to produce the most active and stable form. For this reason the potassium ions are usually added as the hydroxide and calculated as moles of $K_2O$. For our purposes from 0.05 to 2.2 moles, preferably 0.05 to 0.7 $K_2O$ are added as KOH to either a sodium X or sodium Y-type precursor mixture, per mole $Al_2O_3$ in the slurry.

The next step in the instant process involves adding nucleation centers to the precursor mixture containing potassium. U.S. Pat. No. 3,574,538 issued Apr. 13, 1971 describes a process for preparing crystalline aluminosilicates using the "seeding" technique. The zeolite seeds are nucleation centers having an average size below about a tenth of a micron. As pointed out in this patent, the seeding technique is advantageous in that it decreases the aging time necessary for the formation of the zeolite. In the conventional processes, the reaction product is aged at varying temperatures for periods of 1 to 4 days.

Using the seeding technique, this aging time can be reduced to lower values, sometimes as low as 10 to 30 minutes.

The nucleation centers are small particles that may be either amorphous or crystalline. They are prepared by a special technique. The method of preparing these seeds is not a part of this invention. Broadly, the method of preparing the crystalline seeds comprises mixing solutions of sodium aluminate, sodium silicate, and sodium hydroxide in the desired proportions. These solutions are then cooled and aged.

Seeds are normally added as from 0.1 to 10 weight percent (based on the weight of the final theoretical yield of the zeolite product). However, amounts of seeds in excess of about 10% may be used, but do not increase the rate of zeolite production in proportion to the economic value of the additional seed material, except that high seeding levels produce small particles. Likewise less than 0.1 weight percent of the seeds may be used. However, the reaction is very slow under these conditions. The mixing procedure used in combining the seeds with the precursor mixture should be one which results in a rapid and thorough dispersion of the seeds throughout the mixture.

At this point, it should be noted that in another embodiment of the present inventive process potassium ions may be added as KOH subsequent to the addition of the nucleation centers to the precursor mixture without adversely affecting the end product and crystals.

The slurry of potassium containing precursor mixture and seeds is heated at temperatures of about 60° to 100° C. until crystallization occurs, generally for a period ranging from 10 minutes to 30 hours. It has been found that during this reaction period the desired crystalline zeolite forms, and the yields which approach the theoretical yield expected from the starting materials present in the reaction mixture can be recovered. The reaction may be conducted at relatively uniform temperatures or if desired may be conducted at a series of different temperatures; that is, the slurry may be first aged at temperatures of from about 25° to 40° C. for a period of 2 minutes to 24 hours and subsequently heated to a higher temperature of from about 40° to 110° C. for a period of about 10 minutes to 30 hours. Shorter crystallization times can be achieved by reacting the slurry at elevated pressures (up to 5 atmospheres) at temperatures up to 150° C., but as this requires expensive pressure equipment, it is not considered to be economically advantageous. It is also to be understood that the reaction may be conducted where the temperature is continuously varied. Subsequent to the reaction, the resultant crystalline product is recovered by any convenient technique which may involve filtration or centrifigation. The recovered product is preferably washed to remove excess reactants and subsequently may be dried or used in the form of an aqueous slurry.

Figure 2:
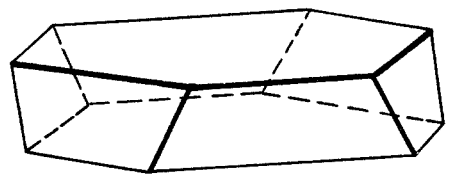
FIG. 2 is a drawing of a faujasite crystal obtained by the process of the present invention which indicates the crystal shape of our novel platelet faujasite type product is a flattened octahedron.

In the synthesis of modified sodium X zeolite 0.35 moles $K_2O$ yielded approximately 25% flattened (platelet) crystals of the type shown in FIG. 2 mixed with 75% normal ones, as shown in FIG. 1, while the higher amount gave approximately 50% of each type as shown in FIG. 4. The flattened crystals which are mal-formed, i.e. flattened, octahedra were about 0.5 by 0.25 microns and the normal octahedral crystals 0.4 to 0.5 microns.

Figure 3:
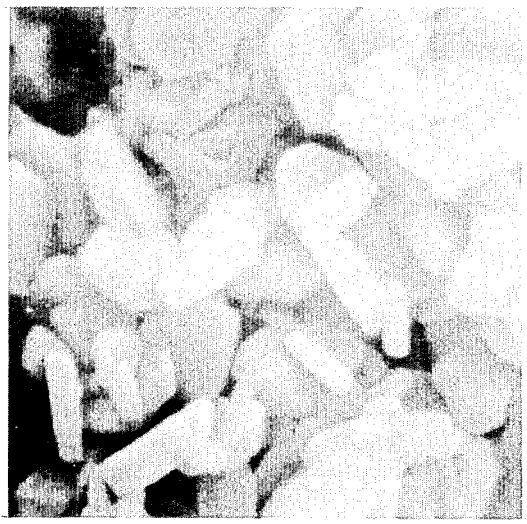
FIG. 3 is a scanning electron microscope (SEM) photograph of the novel platelet faujasite of the present invention taken at magnification of 50,000×.
Figure 4:
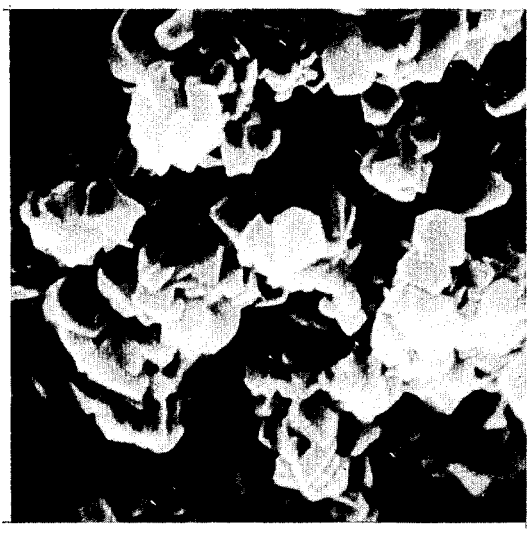
FIG. 4 is a SEM photograph taken at 30,000× of a 50:50 mixture of platelet and conventional faujasite prepared by one preferred practice of our invention.

In the case of modified sodium Y, all of the product crystals were flattened as shown in FIGS. 2 and 3 upon the addition of 0.35 to 0.7 moles $K_2O$. The slurry of example 3, in which 20% seeding is used, yields platelet Y crystals approximately 0.2 to 0.3 microns wide and 0.1 to 0.15 thick while the Y slurries of examples 2 and 5 produce ~0.25×~0.5×~0.5 platelet crystals. The larger amount of $K_2O$ produced the most flattening.

The novel faujasite product of the present invention may be used to prepare adsorbent and catalyst compositions. The product may be advantageously ion exchanged with metal ions from Group IB to VIII of the periodic table and combined with inorganic oxide matrix components such as silica, alumina, and silica-alumina hydrogels and/or clay to form petroleum conversion catalysts. In the rare earth ion exchanged form the present zeolites are active as catalytic cracking catalysts.

Our invention is further illustrated by the following specific but non-limiting examples.

EXAMPLE 1

This example illustrates the process of preparing amorphous nucleation centers. A 290 gram quantity of sodium aluminate was dissolved in 2 liters of water. A sodium silicate solution was made up by dissolving 1120 grams of sodium hydroxide and 2680 grams of water and 4200 grams of sodium silicate solution. The resulting solution was cooled to 15° C. and aged without stirring for 16 hours. At the end of this time, the slurry of amorphous nucleation centers was ready for use.

EXAMPLE 2

This example details the preparation of the modified sodium Y-type zeolite of the present invention.

An aluminate solution was made by dissolving 35.5 grams alumina trihydrate in a solution of 32 grams sodium hydroxide in 50 grams water. Next a solution of 22 grams potassium hydroxide in 125 grams water was added. The aluminate solution was blended into a mixture of 412 grams water and 823 grams sodium silicate solution (27% $SiO_2$ and 8.2% $Na_2O$). Then 70 milliliters of a seeding mixture (slurry ratio $16Na_2O:1Al_2O_3:15SiO_2:320H_2O$) was stirred into the above mixture and the entire slurry was heated to 95°–105° C. for 3–7 hours. The product was a mixed (Na,K) Y type faujasite whose analysis was:

1.4%—$K_2O$
11.4%—$Na_2O$
65.2%—$SiO_2$
22.1%—$Al_2O_3$

The individual crystals have a flattened platelet-like shape of ~0.25×~0.5 micron and are shown in FIG. 3. The surface area was 830 $m^2/g$ after calcination at 1000° F. for 1 hour.

EXAMPLE 3

In accordance with the procedure set forth in Example II, a series of X and Y type modified zeolites were prepared, the data covering which are set forth in Table I.

TABLE I

| Sample π | 1 | 2 | 3 | 4 |
|---|---|---|---|---|
| Sieve type | X | X | Y | Y |
| Slurry ratio | 3.3 $Na_2O$:1 $Al_2O_3$: 4.1 $SiO_2$:122 $H_2O$ | Same as 1 | 7 $Na_2O$:1 $Al_2O_3$: 16 $SiO_2$:280 $H_2O$ | Same as 3 |
| Moles $K_2O$ | 0.7 | 0.35 | 0.7 | 0.35 |
| % Seeding | 5 | 5 | 20 | 20 |
| Hours Heated | 3,5 | 3,5 | 3,4 | 3,4 |
| Surface area $M^2/g$ | 740,776 | 770,776 | 635,570 | 766,695 |
| Unit Cell* | 24.96 | 24.91 | 24.70 | 24.67 |
| Particle size, microns, & shape | 0.4–0.5 octahedra mixed with flattened crystals as shown in FIG. 4, | same as 1 | 0.2–0.3 flattened octahedra 0.1–0.15 thick | same as 3 |
| % flat crystals | 50 | 25 | 100 | 100 |

*determined from the X-ray diffraction pattern using standard techniques.

EXAMPLE 4

887.5 grams of alumina trihydrate were dissolved in a solution of 800 grams sodium hydroxide in 1250 grams water. After the alumina trihydrate dissolved, a solution of 550 grams potassium hydroxide in 3125 grams water was added. The aluminate solution was blended into a mixture of 20,750 grams sodium silicate solution (27% $SiO_2$ and 8.2% $Na_2O$) and 10,228 grams water. Then 1750 milliliters of a seeding mixture (slurry ratio $16Na_2O:1Al_2O_3:15SiO_2:320H_2O$) were added, and the entire slurry was heated to 100° C. for 7 hours. The product is a mixed (Na, K) Y type faujasite having a platelet particle shape of ~0.25 × ~0.5 micron. The calcined product had a surface area of 710 $M^2/g$. It contained 11.3% $Na_2O$ and 1.2% $K_2O$, by weight.

A portion of this batch was made into a cracking catalyst promoter. A Promoter sample had the following analysis:

| Surface Area | 700 M²/g | RE₂O₃ | 19.2% |
|---|---|---|---|
| Na₂O | 0.46% | | |

This promoter was made into catalyst containing 2.42 wt. percent $RE_2O_3$ and pilot tested after S-20 steam deactivation at 920° F., a catalyst to oil ratio of 4, and weight hourly space velocity of 40. It converted 65.9 volume % of feed and made 4.5% coke (wt.% feed). The detailed results are given in the appended Table II. This test shows that cracking catalyst made from platelet Y has essentially the same activity as the standard catalyst made from regular Y.

TABLE II

| Pilot Unit Data: | | Example 4 | standard |
|---|---|---|---|
| | | 920° F., 4 c/o, 40 WHSV, WTGO Feed (Catalytst deactivated by S-20 steam) | |
| Conversion | V % | 69.5 | 72.5 |
| H₂ | W % | 0.04 | 0.05 |
| C₁ + C₂ | W % | 1.0 | 1.37 |
| Total C₃ | V % | 7.5 | 7.8 |
| C₃⁼ | V % | 6.0 | 5.7 |
| Tolal C₄ | V % | 9.9 | 11.4 |
| C₄⁼ | V % | 4.3 | 4.1 |
| iC₄ | V % | 4.7 | 6.1 |
| C₅+ Gasoline | B % | 60.5 | 61.0 |
| Gaso./Conv. Ratio | | 0.87 | 0.85 |
| RON + 0 | | 85.9 | 86.4 |
| RON + 3 | | 95.4 | 95.5 |
| MON + 0 | | 76.0 | 76.5 |
| MON + 3 | | 85.4 | 84.0 |
| Aniline Pt. | °F. | 96 | 93 |
| Br. Number | | 46 | 36 |
| Coke | W % FF | 4.5 | 5.7 |

*20% steam atmosphere for 12 hours at 1520° F.

This example shows that platelet-type Y zeolites can be substituted for normal Y in catalyst compositions without adverse affect on catalyst performance.

EXAMPLE 5

This example demonstrates the use of a low level of $K_2O$ to produce a Y-type faujasite which has a mixture of platelet and regular octahedral crystals in approximately 50—50 ratio.

A solution of sodium aluminate was prepared by dissolving 28 g. alumina trihydrate in a solution of 20 g. sodium hydroxide in 40 ml. water. After the alumina trihydrate dissolved, 40 ml. more water was added and the solution cooled to room temperature; then the aluminate solution was added to a mixture of 598 g. sodium silicate (25.5% SiO₂;7.8% Na₂O) and 119 g. seeds in a reaction vessel with rapid stirring. Next a solution of 3 g. potassium hydroxide in 42 ml. water was added with stirring. Finally 134 g. aluminum sulfate solution (8.33% Al₂O₃) was added with rapid stirring. This yielded a synthesis slurry having the following ratios of reactants: 3Na₂O:0.08K₂O:1Al₂O₃:9SiO₂:130H₂O.

The reaction vessel was fitted with a reflux condenser and the slurry was heated to 100±2° for 18 hours. The product was collected on a filter, washed free of soluble salts and dried at 110° C. The zeolite thus synthesized was a Y-type faujasite which had a surface area of 733 m²/g and a unit cell size of 24.64 Å. Chemical analysis showed the K₂O content to be 0.6% on a dry basis. Scanning electron micrographs showed the particles to be ~0.25×0.5×0.5 micron platelets and 0.4–0.6 micron octahedra in about a 1:1 mixture.

EXAMPLE 6

This example demonstrates that 3/32 inch pills (3/32 inch diameter and 1/16 inch long) made from platelet Y-type faujasite are stronger than the pills made from conventional Y-type faujasite which has an octahedral crystal shape.

A sample of mixed platelet and octahedral Y-type faujasite, prepared in Example 5, was dried at 110° C. to about 20% moisture content. A sample of conventional Y-type faujasite made from essentially the same slurry oxide ratio as used in Example 5, but lacking any K₂O in the slurry, had 0.4–0.8 micron particles having an octahedral shape; this was also dried at 110° C. to about 20% moisture content. A 49 gram portion of each zeolite was thoroughly mixed with 1 gram of Sterotex (a lubricant for pilling and extruding dies, supplied by Capital City Product Co., Columbus, Ohio).

The mixtures were pressed into ½ inch dia.×½ inch long pellets using a commercially available pellet press. Then the pellets were pulverized to granules and the granules sieved. The 40–80 mesh fraction of granules was made into pills on a Stokes Tablet Machine Model 511-5 (F. J. Stokes Corporation, Philadelphia, Pennsylvania) using 3/16 inch diameter dies.

Ten pills from each lot were selected at random for crushing on a Chatillon crush strength meter for pills, tablets and extrudates. Each pill was crushed perpendicular to its diameter. The average crush strength of the pills prepared from the mixed platelet/octahedral shaped Y-type faujasite from Example 5 was 1.1 pounds/pill while the average crush strength of the pills prepared from conventional Y-type faujasite was only 0.5 pound/pill.

Thus it is apparent, the addition of platelet shaped Y crystals to conventional octahedrally shaped crystals, yields a product of significantly greater crushing strength. Kaolin, a platelet shaped inert material, is often added to zeolite pills, extrusions and spheres to enhance binding, improve strength and help in the forming step. Unfortunately, kaolin is inert and therefore reduces the sorptive capacity of the zeolite sorbent, or the catalytic activity of the catalyst. By replacing the kaolin with the above disclosed platelet form of faujasite, the advantages of using kaolin are retained, and the disadvantages eliminated, as the platelet faujasite has similar sorptive and catalytic properties to the conventional octahedral faujasite.

EXAMPLE 7

To illustrate the necessity of adding the potassium ion component to the reaction mixture rather than to the seed component, the experiments tabulated in Table III were conducted.

The reaction mixture ratios for the seeds were 7Na₂O:K₂O:1Al₂O₃:16SiO₂:280H₂O, whereas the seed reaction mixture ratios were 16-(A) Na₂O:(A) K₂O:1.2Al₂O₃:15SiO₂:320H₂O. It is concluded from the above that inclusion of K₂O by way of the seed composition leads to the formation of little, if any zeolite, and no flattened crystals.

TABLE III

| Experiment No. | Seeds Alkali Oxides Na₂O | Seeds Alkali Oxides K₂O(A) | Slurry K₂O (B) | Hours At 100 ± 2° C. | Surface Area, m²/g | Product Properties Zeolite Quality | Particle Shape |
|---|---|---|---|---|---|---|---|
| 1 | 16 | 0 | 0 | 6 | 785 | Very good Y | Regular octahedra |
|   |    |   |   | 12 | 776 | " |   |
| 2 | 14.4 | 1.6 | 0.08 | 5 | <10 | Amorphous | Regular octahedra mixed with tiny round gel particles |
|   |      |     |      | 9 | 358 | Poor Y |   |
| 3 | 14 | 2 | 0.1 | 6 | <10 | Only trace Y |   |
|   |    |   |     | 12 | <10 |   | " |
| 4 | 12 | 4 | 0.2 | 6 | <10 | Amorphous |   |
|   |    |   |     | 12 | <10 | No Y, some P* and S** |   |
| 5 | 8 | 8 | 0.4 | 6 | <10 | Amorphous |   |
|   |   |   |     | 12 | <1.0 | No Y, much P*, some S** |   |

*A synthetic phillipsite species discovered by R. M. Barrer et al.
*A synthetic gmelinite-like species discovered by R. M. Barrer et al.

EXAMPLE 8

To illustrate the necessity of using seeds with the potassium ion containing zeolite forming reaction mixtures of the present invention in order to obtain the novel platelet crystals, several zeolite preparation methods described in the prior art were duplicated. These methods include the addition of potassium ions to non-seeded reaction mixtures of silica, alumina, water and sodium hydroxide. In Table IV below the prior art methods utilized along with the results obtained are summarized.

TABLE IV

|   | Slurry Ratio: 1.0 Al₂O₃ Na₂O | K₂O⁽¹⁾ | SiO₂ | H₂O | Cold Age, Hrs. | T°C. Crystal. Temp. | Hours at Temp. | Surface Area, m²/g | X-Ray % Crystal. | Faujasite Morphology |
|---|---|---|---|---|---|---|---|---|---|---|
| U.S. Pat. No. 3,374,058 Example 1 | 3.2 | 0.2 | 9.6 | 135 | 72 | 100 ± 1 | 16 | 816 | 80 | Random shapes, no platelets |
|   |     |     |     |     |    |         | 40 | 631 |    |   |
|   | 3.2 | 0.4 | 9.6 | 135 | 72 | 100 ± 1 | 16 | 45 | Nil | No crystals |
|   |     |     |     |     |    |         | 40 | 32 |     |   |
|   | 3.2 | 0.8 | 9.6 | 135 | 72 | 100 ± 1 | 16 | 54 | Nil | No crystals |
|   |     |     |     |     |    |         | 40 | 27 |     |   |
| British 1,111,849 Example 1 | 4.8 | 1.3 | 2.3 | 106 | 0 | 82 ± 1 | 8 | 611 | 80 | Rounded agglomerates of equant octahedra |
|   |     |     |     |     |    |        | 10 | 576 |    |   |
|   |     |     |     |     |    |        | 12 | 642 |    |   |
|   | 4.8 | 1.3⁽²⁾ | 2.3 | 106 | 0 | 82 ± 1 | 8 | 364 | 40 | Rounded agglomerates of equant octahedra |
|   |     |        |     |     |    |        | 10 | 293 |    |   |
|   |     |        |     |     |    |        | 12 | 354 |    |   |
|   | 4.8 | 0.65 | 2.3 | 106 | 0 | 82 ± 1 | 4 | 39 | 0 | No crystals |
|   |     |      |     |     |    |        | 8 | 37 |   |   |
|   | 4.8 | 0 | 2.3 | 106 | 0 | 82 ± 1 | 4 | 37 | 0 | No crystals |
|   |     |   |     |     |    |        | 8 | <10 |   |   |
| U.S. Pat. No. 3,767,771 Example 2 | 3.0 | 0.7 | 4.2 | 116 | 0 | 95 ± 1 | 10 | 546 | 38 | Excellent equant octahedra |
|   |     |     |     |     |    |        | 14 | 563 |    |   |
|   | 3.3 | 0.8 | 4.5 | 130 | 0 | 95 ± 1 | 10 | 695 | 80 | Excellent equant octahedra |
|   |     |     |     |     |    |        | 14 | 730 |    |   |
|   | 3.9 | 1.0 | 5.0 | 150 | 0 | 95 ± 1 | 10 | 663 | 75 | Excellent equant octahedra |
|   |     |     |     |     |    |        | 14 | 643 |    |   |

⁽¹⁾K₂O from KOH except for footnote⁽²⁾
⁽²⁾Use of KCl instead of KOH.

From the above data it is noted that using the procedures of the prior art wherein potassium ions are present in the zeolite reactor mixtures but seeds are absent, platelet shaped crystals were not obtained.

What is claimed is:

1. In a process for preparing synthetic faujasite type zeolites wherein amorphous aluminosilicate zeolite nucelation centers having a particle size of below 0.1 microns are combined with a zeolite producing reaction mixture which contains alumina, silica, alkali metal hydroxide and water, and the mixture is heated to obtain faujasite type zeolite crystals, the improvement comprising:

(a) preparing a reaction mixture containing the following mol ratios of ingredients:
$Na_2O/SiO_2$—0.3 to 9
$SiO_2/Al_2O_3$—3 to 25
$H_2O/Na_2O$—12 to 90
$K_2O/Al_2O_3$—0.05 to 1.2

(b) adding to said mixture amorphous aluminosilicate zeolite nucleation centers having a particle size of below 0.1 microns, consisting essentially of the following range of composition:
$Na_2O$—12 to 20
$SiO_2$—14 to 19
$Al_2O_3$—0.75-5
$H_2O$—100 to 600

(c) heating the reaction mixture at a temperature of 40° to 150° C. for a period of about 10 minutes to 30 hours to obtain a faujasite type zeolite product wherein greater than about 5 percent by weight of the crystals comprising said product are characterized by a platelet flattened octahedron shape.

2. The process of claim 1 wherein said reaction mixture contains the following mol ratios of ingredients:
$Na_2O/SiO_2$—0.3 to 1.5
$SiO_2/Al_2O_3$—3 to 5
$H_2O/Na_2O$—30 to 50

$K_2O/Al_2O_3$—0.05 to 1.2.

3. The process of claim 1 wherein said reaction mixture contains the following mol ratios of ingredients:

$Na_2O/SiO_2$—0.3 to 9
$SiO_2/Al_2O_3$—5 to 25
$H_2O/Na_2O$—12 to 90
$K_2O/Al_2O_3$—0.05 to 1.2.

4. The process of claim 1 wherein said nucleation centers are included in amounts ranging from about 0.1 to 40 mol percent based on the total amount of alumina in the mixture including that in the nucleation centers.

5. The process of claim 1 wherein said reaction mixture at step (c) is heated to 60° to 100° C. for about 10 minutes to 30 hours.

6. A faujasite type zeolite product prepared by way of the process of claim 1 wherein greater than about 5 percent by weight of the crystals are characterized by a platelet flattened octahedron shape.

7. The zeolite product of claim 6 having a silica to alumina ratio of about 2.2 to 6.

8. The zeolite product of claim 6 wherein greater than about 90 percent by weight of the crystals are characterized by a platelet flattened octahedron shape.

9. The zeolite product of claim 6 exchanged with metal ions selected from Group IB through VIII of the periodic table.

10. An adsorbent composition comprising the zeolite product of claim 6 and up to about 90 percent by weight of an inorganic oxide component selected from the group consisting of silica, alumina, silica-alumina hydrogel and clay.

11. The adsorbent composition of claim 10 in which the zeolite product is exchanged with metal ions selected from the group consisting of Group IB to Group VIII of the periodic table.

12. A hydrocarbon conversion catalyst containing the zeolite product of claim 6.

13. The catalyst of claim 12 which contains an amorphous inorganic oxide matrix.

14. The catalyst of claim 13 in which the zeolite product is exchanged with rare earth metal ions.

15. The catalyst of claim 12 exchanged with ions selected from the group consisting of Group IB to Group VIII of the periodic table.

* * * * *